United States Patent
Zhang et al.

(10) Patent No.: US 12,078,484 B2
(45) Date of Patent: Sep. 3, 2024

(54) OPTOMECHANICAL GYROSCOPE ON PLANAR PLATFORM

(71) Applicant: ANYON TECHNOLOGIES PTE. LTD., Singapore (SG)

(72) Inventors: Hongbo Zhang, Singapore (SG); Hengjiang Ren, Singapore (SG); Jie Luo, Los Angeles, CA (US)

(73) Assignee: ANYON TECHNOLOGIES PTE. LTD., Singapore (SG)

( * ) Notice: Subject to any disclaimer, the term of this patent is extended or adjusted under 35 U.S.C. 154(b) by 99 days.

(21) Appl. No.: 17/950,133

(22) Filed: Sep. 22, 2022

(65) Prior Publication Data

US 2023/0366679 A1  Nov. 16, 2023

(30) Foreign Application Priority Data

May 13, 2022 (SG) .............................. 10202205052P (51) Int. Cl.
*G01C 19/5712* (2012.01)

(52) U.S. Cl.
CPC ................. *G01C 19/5712* (2013.01)

(58) Field of Classification Search
CPC . G01C 19/5712; G01C 19/5755; B82Y 20/00
See application file for complete search history.

(56) References Cited

U.S. PATENT DOCUMENTS

| | | | | |
|---|---|---|---|---|
| 2004/0076362 A1* | 4/2004 | Wong | .................... | G02F 1/0128 385/14 |
| 2004/0080726 A1* | 4/2004 | Suh | ........................ | B82Y 20/00 353/122 |
| 2004/0120380 A1* | 6/2004 | Kim | ....................... | B82Y 20/00 372/92 |
| 2005/0008308 A1* | 1/2005 | Bita | ........................ | B82Y 20/00 385/123 |
| 2005/0213868 A1* | 9/2005 | Cunningham | ......... | B82Y 20/00 385/12 |

(Continued)

FOREIGN PATENT DOCUMENTS

| CN | 113156162 A | 7/2021 |
|---|---|---|
| CN | 113916209 A | 1/2022 |

OTHER PUBLICATIONS

Hassan J. N. A. et al., Design of optical gyroscope based on the cavity optomechanics structure. 2022 Photonics & Electromagnetics Research Symposium (Piers), Hangzhou, China, Apr. 29, 2022, pp. 585-592.

*Primary Examiner* — David J Bolduc
(74) *Attorney, Agent, or Firm* — IPRTOP LLC (57) ABSTRACT

A sensing component of a gyroscope and an opto-MEMS gyroscope comprising said sensing component are provided, the sensing component comprising, a frame; a proof mass configured to be displaced in response to a Coriolis force applied to the sensing component; and a photonic crystal cavity comprising, a first photonic crystal coupled to the proof mass; and a second photonic crystal coupled to the frame; wherein the first and second photonic crystals each comprises an array of holes formed thereon; wherein the photonic crystal cavity is configured to generate an optical output in response to the Coriolis force, and wherein the sensing component is configured to measure the Coriolis force based on changes in the optical output.

14 Claims, 8 Drawing Sheets

(56) References Cited

U.S. PATENT DOCUMENTS

| | | | |
|---|---|---|---|
| 2006/0103851 A1 | 5/2006 | Nathan et al. | |
| 2008/0159686 A1* | 7/2008 | Xu | B82Y 20/00 |
| | | | 385/12 |
| 2011/0180779 A1* | 7/2011 | Han | H01L 33/06 |
| | | | 977/950 |
| 2014/0060178 A1* | 3/2014 | Wong | G01V 7/005 |
| | | | 73/382 G |
| 2014/0283601 A1* | 9/2014 | Bhave | G01B 11/14 |
| | | | 73/504.12 |
| 2015/0020590 A1 | 1/2015 | Painter et al. | |
| 2016/0069686 A1* | 3/2016 | Lee | G01C 19/5691 |
| | | | 356/460 |
| 2017/0222724 A1* | 8/2017 | Chang | H04B 10/11 |
| 2022/0341963 A1* | 10/2022 | Ren | G01P 15/093 |

\* cited by examiner

OPTOMECHANICAL GYROSCOPE ON PLANAR PLATFORM

TECHNICAL FIELD

The present disclosure relates broadly to a sensing component of a gyroscope and a gyroscope e.g., an opto-MEMS gyroscope comprising the sensing component.

BACKGROUND

A gyroscope is a device mounted on an equipment and used for measuring angular velocity or maintaining orientation. Gyroscopes can be used in various systems, such as Steadicam, gyrocompass, heading indicator, navigation system, and inertial measurement unit. Depending on the working mechanism and technical specification, many kinds of gyroscopes exist, such as mechanical gyroscopes, optical gyroscopes, and micro-electro-mechanical systems (MEMS) gyroscopes. Among them, optical gyroscopes, including ring laser gyroscopes (RLG) and fiber optic gyroscopes (FOGs), display high performance, but their size is still relatively large. Besides accuracy and performance, current requirements for gyroscopes in modern navigation systems are small size, low cost, and high power efficiency. Smaller sizes allow navigation devices to be compatible with scaling down and self-guiding systems such as drones which were believed to be unachievable in the past. In the last decades, MEMS gyroscopes have grown rapidly because of their acceptable performance and great demand in the commercial market.

Compared with conventional mechanical gyroscopes and optical gyroscopes, MEMS gyroscopes have their unique advantages in terms of scale and cost. In general, MEMS gyroscopes fit the requirements of the consumer and industrial market, which provide high reliability and necessarily high performance for the appropriate grade. In consumer applications, MEMS gyroscopes have been equipped in many machines like automobiles, smartphones, and Internet of Things (IoT) devices. In industrial markets, most systems with feedback control are embedded with a MEMS gyroscope, such as mechanical arms and automatic conveyors.

MEMS gyroscopes measure angular velocity by using vibrating elements. The mechanism of all MEMS gyroscopes is based on the Coriolis Effect for energy transfer between their vibrational drive mode and sense modes.

Even though MEMS gyroscopes have achieved great success in the market, they are facing challenges in terms of their performance. Fast interaction in extensive IoT devices and virtual spaces requires high resolution. In general, the primary operating mechanism of a MEMS gyroscope is to probe the Coriolis force of a flexibly mounted proof mass in the sense mode when the frame is rotating. A readout of displacement or force is one of the important factors to determine the resolution. Transduction schemes of displacement or force in conventional MEMS gyroscopes can be based on capacitors, piezoelectrics, tunneling effects, and optical methods. For example, MEMS gyroscopes based on piezoelectric generally own a large dynamic measurement range, but it is challenging to integrate such kinds of gyroscope on-chip. Additionally, MEMS gyroscopes based on tunneling effects suffer from disadvantages of narrow dynamic ranges and critical requirements in fabrication technology, like precise distance control of a small tip over a surface in atomic scale. MEMS gyroscopes based on capacitive method has been extensively developed due to their easy fabrication, environmental stabilities, and simple feedback control. Nevertheless, capacitive gyroscopes have their disadvantages like parasitic capacitance, curling effect, and narrow bandwidth. In addition, electronic-based gyroscopes are sensitive to electromagnetic interference, thus limiting their applications in complicated environments.

In contrast, gyroscopes based on optical readout may introduce several advantages, such as superior displacement resolution, resilience to electromagnetic interference, and higher thermal stability. These advantages can help to develop optical gyroscopes with high sensitivity, wide bandwidth, and good reliability. However, conventional optical gyroscopes like RLGs and FOGs, do not allow for chip-scale integration.

Some efforts have been made to achieve optical readout in MEMS gyroscopes. However, in previous studies/designs, only a simple Fabry-Perot cavity or interferometer was built, which had a small optical Q factor, leading to low sensitivity. Therefore, a large proof mass was required as compensation for the low sensitivity, resulting in a low resonant frequency. Thus, its bandwidth was limited due to the low resonant frequency. In addition, the previous designs usually required additional fiber or free space laser, which hindered on-chip integration and packaging. Thus, the costs of the previous designs were relatively high.

Thus, there is a need for a sensing component of a gyroscope and a gyroscope e.g., an opto-MEMS gyroscope comprising the sensing component that seek to address or alleviate at least one of the above problems.

SUMMARY

In accordance with an aspect of the present disclosure, there is provided a sensing component of a gyroscope, the sensing component comprising, a frame; a proof mass configured to be displaced relative to the frame in response to a Coriolis force applied to the sensing component; and a photonic crystal cavity comprising, a first photonic crystal coupled to the proof mass; and a second photonic crystal coupled to the frame; wherein the first and second photonic crystals each comprises an array of holes formed thereon; wherein the photonic crystal cavity is configured to generate an optical output in response to the Coriolis force, and wherein the sensing component is configured to measure the Coriolis force based on the optical output.

The photonic crystal cavity may further comprise a gap defined between the first and second photonic crystals; wherein the gap comprises a gap size that is defined as the distance between two opposing surfaces of the first and second photonic crystals; and wherein the optical output of the photonic crystal cavity is configured to be modulated by a change in the gap size.

The first photonic crystal may be configured to move in tandem with the proof mass; and the gap size may be configured to change in response to the movement of the first photonic crystal.

The change in the gap size may cause boundary conditions and optical confinement parameters of the photonic crystal cavity to be changed, which in turn causes the optical output of the photonic crystal cavity to be changed.

The photonic crystal cavity may further comprise a third photonic crystal coupled to the first photonic crystal and the second photonic crystal, such that the third photonic crystal is positioned at the center of the photonic crystal cavity between the first photonic crystal and the second photonic crystal; and wherein the third photonic crystal is configured to be deformed in response to a tensor applied by the first photonic crystal.

Deformation of the third photonic crystal may cause one or more optical properties of the third photonic crystal to be changed, which in turn causes the optical output of the photonic crystal cavity to be changed.

The third photonic crystal may be smaller in size than the first photonic crystal and the second photonic crystal.

The one or more optical properties of the second photonic crystal may comprise permittivity.

The optical output may comprise an optical resonance frequency of the photonic crystal cavity.

The first and second photonic crystals may be symmetrically arranged with respect to each other.

The array of holes in the first and second photonic crystals may comprise a periodic arrangement of holes.

The third photonic crystal may comprise an array of holes with a periodic arrangement.

The first photonic crystal may be configured to move in tandem with the proof mass; and the second photonic crystal may be configured to be stationary with respect to the frame.

The proof mass, the first and second photonic crystals may be made of silicon nitride (SiN).

The proof mass, the first and second photonic crystals may be made of silicon.

In accordance with another aspect of the present disclosure, there is provided an opto-MEMS gyroscope, comprising a sensing component configured to probe a sense mode of the gyroscope, the sensing component comprising, a frame; a proof mass configured to be displaced relative to the frame in response to a Coriolis force applied to the sensing component; and a photonic crystal cavity comprising, a first photonic crystal coupled to the proof mass; and a second photonic crystal coupled to the frame; wherein the first and second photonic crystals each comprises an array of holes formed thereon; wherein the photonic crystal cavity is configured to generate an optical output in response to the Coriolis force, and wherein the sense sensor is configured to measure the Coriolis force based on the optical output.

The photonic crystal cavity may further comprise a gap defined between the first and second photonic crystals; wherein the gap has a gap size that is defined as the distance between two opposing faces of the first and second photonic crystals; and wherein the optical output of the photonic crystal cavity is configured to be modulated by a change in the gap size.

The photonic crystal cavity may further comprise a third photonic crystal coupled to the first photonic crystal and the second photonic crystal, such that the third photonic crystal is positioned at the center of the photonic crystal cavity between the first photonic crystal and the second photonic crystal; and wherein the third photonic crystal is configured to be deformed in response to a tensor applied by the first photonic crystal.

The opto-MEMS gyroscope may further comprise a chip; a drive frame; a plurality of nano tethers configured to suspend the drive frame; a drive sensor configured to probe a drive mode of the gyroscope; a calibration sensor configured to calibrate the motion of the drive frame; and a drive capacitor configured to provide electrostatic impulses for the drive mode.

The opto-MEMS gyroscope may be configured to measure angular velocity based on the Coriolis force measured by the sensing component.

BRIEF DESCRIPTION OF THE DRAWINGS

Example embodiments of the invention will be better understood and readily apparent to one of ordinary skill in the art from the following written description, by way of example only, and in conjunction with the drawings, in which.

DETAILED DESCRIPTION

One or more specific embodiments of the present disclosure will be described below. These described embodiments are only examples of the presently disclosed techniques, and are not intended to limit aspects of the presently disclosed invention. Additionally, in an effort to provide a concise description of these embodiments, all features of an actual implementation may not be described in the specification. It should be appreciated that in the development of any such actual implementation, numerous implementation-specific decisions may be made to achieve the developers' specific goals, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The present disclosure provides a method based on the Coriolis Effect and opto-mechanics to design a gyroscope e.g., an on-chip gyroscope by using photonic crystals to measure a displacement of the gyroscope's sense mode. By combining the advantages of the high resolution and broad bandwidth of opto-mechanical sensors as well as the capitalizable cost of MEMS technology, various embodiments of the gyroscope e.g., on-chip opto-MEMS gyroscope may advantageously achieve higher accuracy. In theory, the accuracy is only limited by the Heisenberg uncertainty principle. Thus, the accuracy with quantum limits of transduction can be realized in the micrometer/sub-micrometer scale opto-MEMS devices.

In various embodiments, a gyroscope e.g., planar on-chip opto-MEMS gyroscope based on photonic crystals is provided. In various embodiments, an opto-mechanical gyroscope on a planar platform is provided. In various embodiments, the gyroscope of the present disclosure inherits advantages of MEMS gyroscopes, such as low cost, small size, low power consumption, and flexible configuration. In various embodiments, the gyroscope of the present disclosure may advantageously overcome high noise density of conventional MEMS gyroscopes due to ultra-high optical Q factor of photonic crystal cavities and outstanding opto-mechanical interaction. In addition, by carefully choosing a material platform with strong tensile stress for the gyroscope, an excellent mechanical Q factor may be further obtained. Advantageously, the gyroscope e.g., opto-MEMS gyroscope, optomechanical gyroscope of the present disclosure may be capable of performing measurements with a high sensitivity, wide bandwidth, and fast response, which is comparable to the performance of conventional optical gyroscopes.

Figure 1:
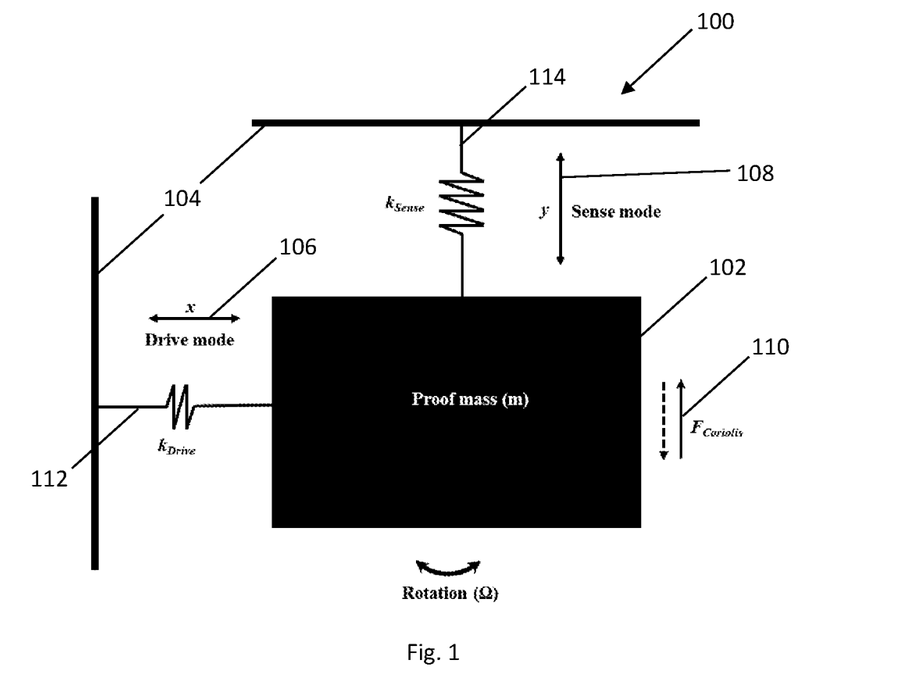
FIG. 1 is a schematic diagram illustrating the working principle of a gyroscope based on the Coriolis Effect according to one embodiment of the present disclosure.

Referring to FIG. 1, FIG. 1 is a schematic diagram illustrating the working principle of a gyroscope 100 based on the Coriolis Effect according to one embodiment of the present disclosure. The gyroscope 100 is constructed by assembling a proof mass 102 into a frame 104, and orthogonally de-coupling two mechanical modes of the gyroscope 100: a drive mode 106 and a sense mode 108. For example, the frame 104 may take the form of a rectangular frame defined by an external rectangle and an inner rectangular formed within the external rectangle. The typical size of the inner rectangle of the frame 104 may be from about 50 micrometers to about 1000 micrometers in terms of its length and breadth, and the typical size of the external rectangle of the frame 104 may be from about 70 micrometers to about 2000 micrometer in terms of its length and breadth. Their sizes depend on the required measuring range of angular velocity due to rotation. The drive mode 106 is the oscillation of the frame 104 along its drive axes for generating momentum. The sense mode 108 is the Coriolis-induced oscillations 110 along their sense axes for measuring rotation. In the drive mode 106, the proof mass 102 is coupled to the frame 104 via one or more springs e.g., 112 having a spring constant $k_{drive}$. In the sense mode 108, the proof mass 102 is coupled to the frame 104 via one or more springs e.g., 114 having a spring constant $k_{sense}$.

Figure 2:
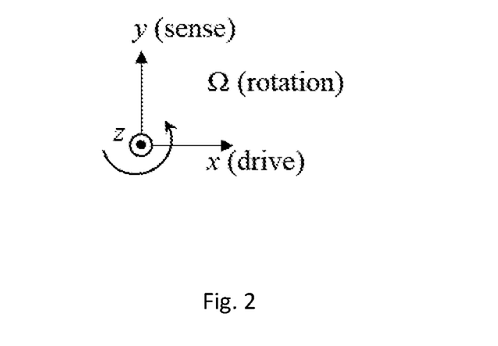
FIG. 2 is a schematic diagram of the Coriolis force according to one embodiment of the present disclosure.

A Coriolis acceleration, proportional to a corresponding angular velocity, is an apparent acceleration that is observed in a rotating frame of reference. To better understand the concept of the Coriolis acceleration, reference is made to FIG. 2. FIG. 2 is a schematic diagram of the Coriolis force according to one embodiment of the present disclosure. As shown in FIG. 2, a proof mass m is moving in space with a velocity v. If the outside frame mounted with the proof mass is rotating with an angular velocity Ω around the z-axis, the proof mass is moving along the y axis with a Coriolis acceleration $\vec{a}_c$ given by:

$$\vec{a}_c = 2\vec{v} \times \vec{\Omega} \tag{1}$$

Note that a real force is not applied along the y-axis.
The corresponding Coriolis force is given by:

$$|F_c| = |2m\vec{v} \times \vec{\Omega}| \tag{2}$$

Once the axis of the drive mode is determined, the displacement of the mass along the y-axis is proportional only to the angular velocity of the mass, which is given by:

$$\Delta y = 2\Omega_z \frac{F_c}{m} \frac{Q_x}{\omega_x} \frac{1}{\sqrt{(\omega_x^2 + \omega_y^2)^2 + \left(\frac{\omega_x \omega_y}{Q_y}\right)^2}} \tag{3}$$

As shown in equation (3), the Coriolis force based gyroscope's sensitivity can be optimized by matching the resonant frequencies $\omega_x$ and $\omega_y$, and by improving the quality factor $Q_{x/y}$.

Figure 3A:
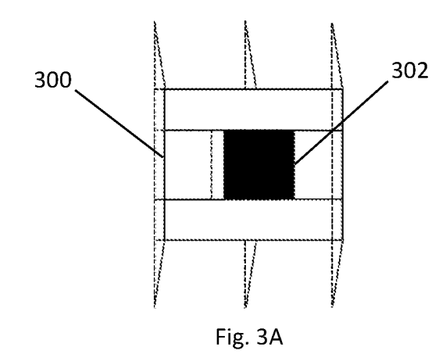
FIG. 3A is a schematic diagram of a drive mode according to one embodiment of the present disclosure.
Figure 3B:
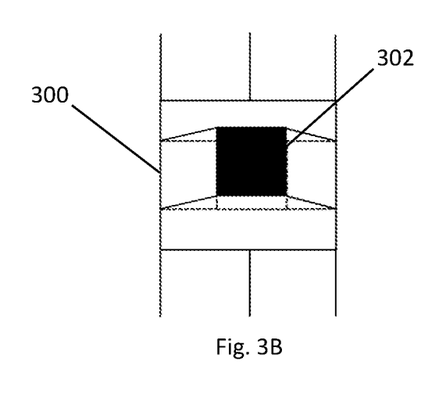
FIG. 3B is a schematic diagram of a sense mode according to one embodiment of the present disclosure.

FIG. 3 is a schematic diagram of a drive mode A and a sense mode B according to one embodiment of the present disclosure.

As shown in FIG. 3A, the drive mode is the motion of a frame 300 containing a proof mass 302 along the x-direction.

As shown in FIG. 3B, the sense mode is the motion of the proof mass 302 along the y-direction, which is due to the Coriolis force.

Embodiment 1

Figure 4:
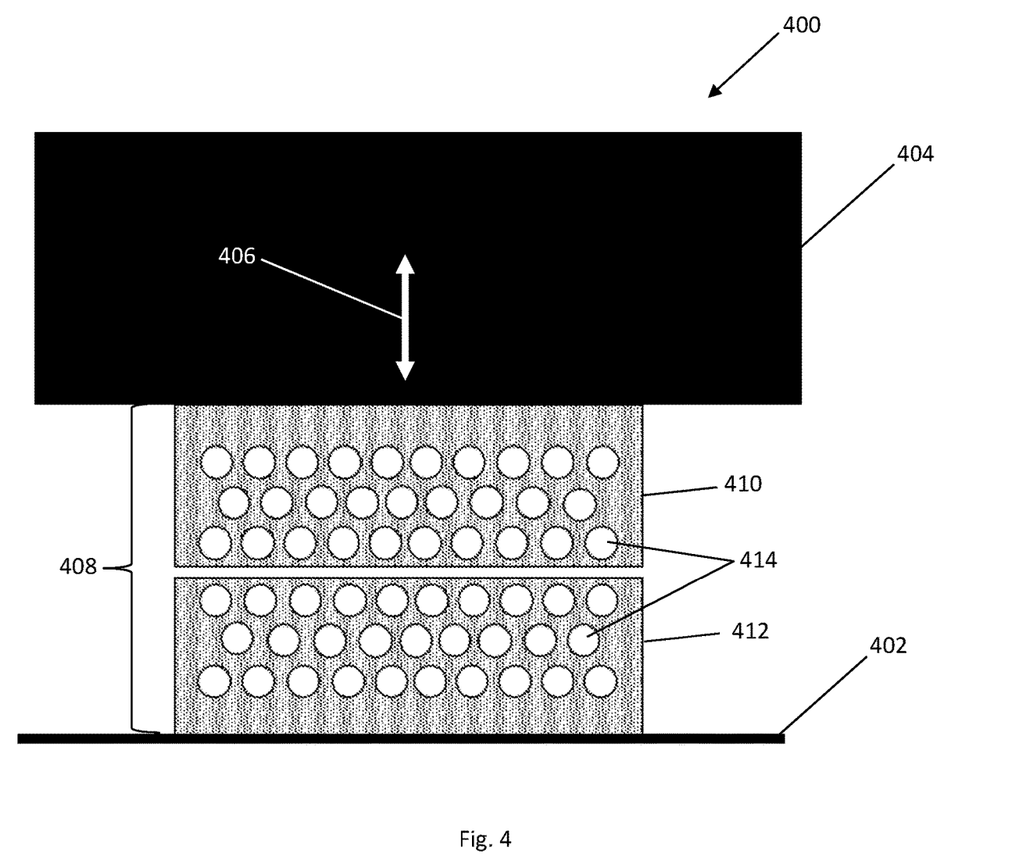
FIG. 4 is a schematic diagram of a sensing component of a gyroscope in one embodiment of the present disclosure.

FIG. 4 is a schematic diagram of a sensing component 400 of a gyroscope in one embodiment of the present disclosure. The sensing component/sensing part/sense sensor 400 comprises a frame 402; a proof mass 404 configured to be displaced relative to the frame 402 in response to a force e.g., Coriolis force 406 applied to the sensing component 400; and a photonic crystal cavity 408 comprising a first photonic crystal 410 coupled to the proof mass 404; and a second photonic crystal 412 coupled to the frame 402. The first photonic crystal 410 and the second photonic crystal 412 each comprises an array of holes e.g., 414 formed thereon. The photonic crystal cavity 408 is configured to generate an optical output/signal in response to the Coriolis force 406, and the sensing component 400 is configured to measure the Coriolis force 406 based on the optical output. In the example embodiment, the measurement of the Coriolis force 406 of the proof mass 404 is probed by the photonic crystal cavity 408 constructed by two photonic crystals; the first photonic crystal 410 is connected to the flexible proof mass 404, and the second photonic crystal 412 is anchored to the frame 402 and can be considered effectively motionless relative to the frame 402 (i.e., remains stationary with respect to the frame 402).

In the example embodiment, the optical output may comprise an optical resonance frequency of the photonic crystal cavity 408. The first photonic crystal 410 and the second photonic crystal 412 may be symmetrically arranged with respect to each other. The array of holes e.g., 414 may have a periodic arrangement. In the example embodiment, the proof mass 404, first photonic crystal 410, second photonic crystal 412 may be made of silicon nitride and/or silicon.

Figure 5:
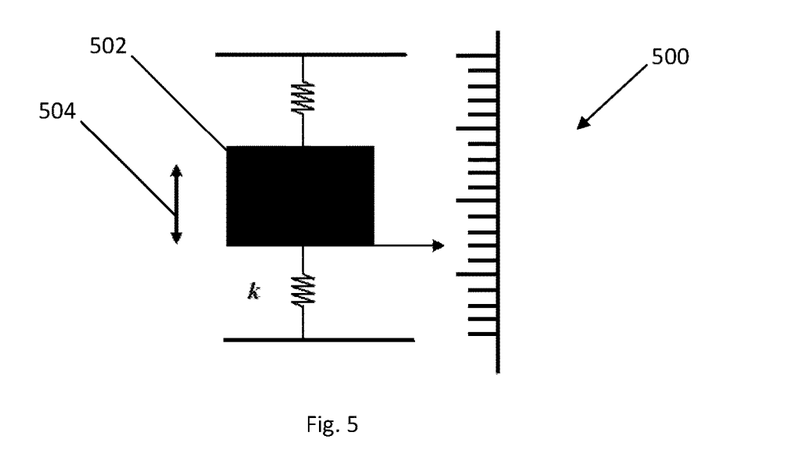
FIG. 5 is a schematic diagram of a sensing component with a proof mass and springs according to one embodiment of the present disclosure.

The measurement of the Coriolis force of the proof mass may be based on moving dielectric boundaries or photo-elasticity. As shown in FIG. 5, a typical sensor 500 to probe the force e.g., Coriolis force comprises a proof mass 502. When a force 504 is applied, the proof mass' 502 inertia causes a relative displacement.

For a sensing component based on moving dielectric boundaries, a photonic crystal cavity is used to transduce the displacement to an optical signal, which is due to a change of boundary conditions and optical confinement. The boundary conditions are strongly correlated to the optical resonance frequency of the photonic crystal cavity, which is also changed simultaneously. Therefore, the displacement can be probed by the change of the optical signal. Then the Coriolis force of the proof mass can be obtained by calibration.

Embodiment 2

Figure 6A:
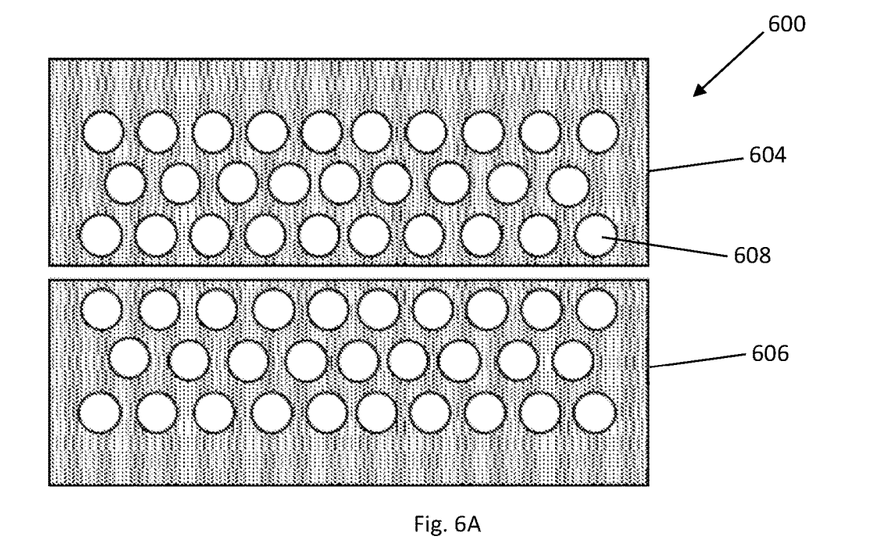
FIG. 6A is a schematic diagram of a photonic crystal cavity sensor according to one embodiment of the present disclosure.

FIG. 6A is a schematic diagram of a photonic crystal cavity sensor 600 according to one embodiment of the present disclosure.

Figure 6B:
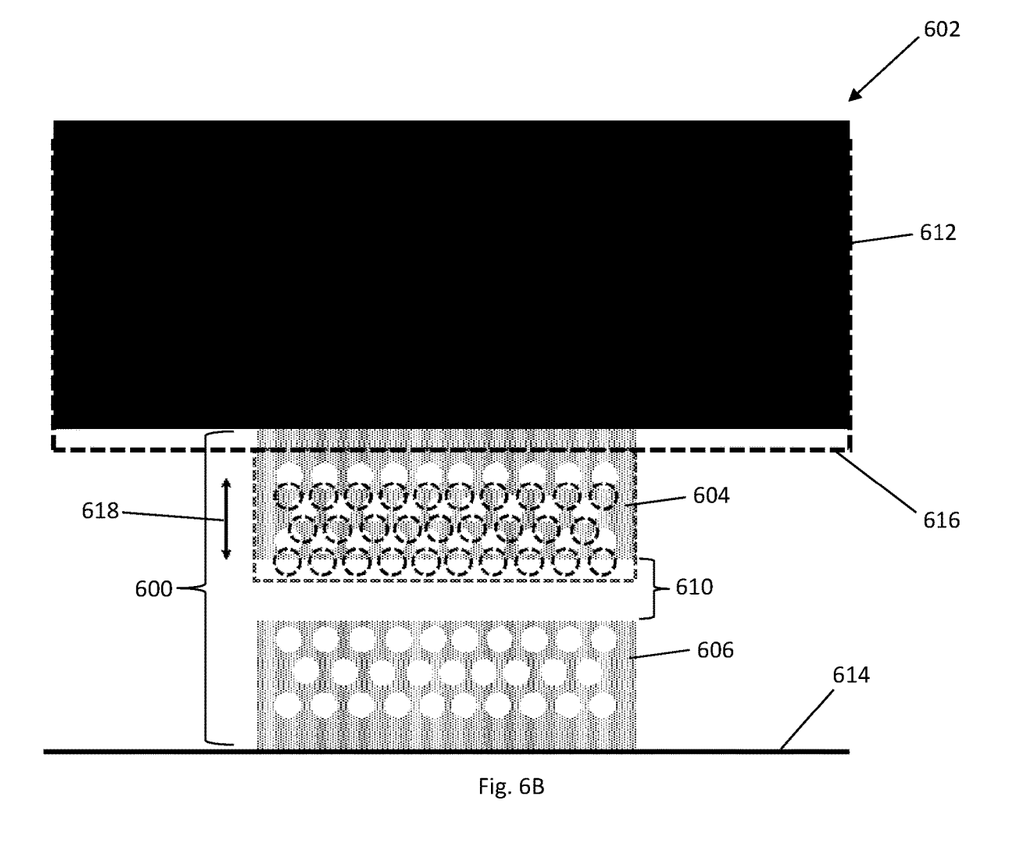
FIG. 6B is a schematic diagram of a sensing component of a gyroscope based on moving boundaries according to one embodiment of the present disclosure.

FIG. 6B is a schematic diagram of a sensing part 602 of a gyroscope based on moving boundaries according to one embodiment of the present disclosure.

This embodiment provides a photonic crystal cavity sensor 600 based on moving boundaries and a corresponding sensing component/sense sensor 602 of a gyroscope that includes the sensor.

As shown in FIG. 6A and FIG. 6B, the photonic crystal cavity 600 comprises two symmetric photonic crystals 604, 606 with a periodic array of holes e.g., 608. The photonic crystal cavity 600 comprises a gap 610 defined between the first photonic crystal 604 and the second photonic crystal 606. The gap 610 is defined in the center of two symmetric photonic crystals 604, 606, and the gap 610 breaks the array's periodicity and confines the optical modes. The first photonic crystal 604 is attached to a proof mass 612, and can move along (i.e., in tandem) with the proof mass 612 when Coriolis force is applied. The second photonic crystal 606 is fixed and remains stationary relative to a frame 614. Note that, in FIG. 6B, the dash frame 616 illustrates the potential motion of the first photonic crystal 604 attached to the proof mass 612, and the arrow 618 represents the possible movement direction of the top part of the photonic crystal cavity 600 (i.e., the first photonic crystal 604).

The gap 610 has a gap size that is defined as the distance between two opposing surfaces of the first and second photonic crystals 604, 606, when the photonic crystals are symmetrically arranged adjacent to each other. The size of the gap 610 in the center can be changed by the motion of the top part of the photonic crystal cavity 600, which tailors the boundary condition and optical confinement of the photonic crystal cavity 600 and further modulates optical output of the photonic crystal cavity 600.

In other words, the optical output of the photonic crystal cavity 600 is configured to be modulated by the change in gap size. The gap size is configured to change in response to the movement of the first photonic crystal 604. The change in the gap size causes boundary conditions and optical confinement parameters of the photonic crystal cavity 600 to be changed, which in turn causes the optical output of the photonic crystal cavity 600 to be changed.

During operation, when the frame 614 is rotating, a sensing part 602 of the gyroscope (including the photonic crystal cavity 600, the proof mass 612, and the frame 614) will be applied a Coriolis force. Thus, by measuring the optical output, information of the motion can be obtained, and further the displacement and Coriolis force of the proof mass 612 can be obtained. As the gyroscope is a rate gyroscope based on the Coriolis force to measure angular velocity, after applying a driving force and measuring the Coriolis force of the sense mode, the angular velocity can be derived from the Coriolis force.

Embodiment 3

Figure 7:
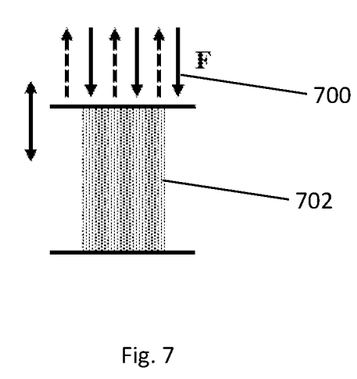
FIG. 7 is a schematic diagram illustrating photo-elasticity according to one embodiment of the present disclosure.

FIG. 7 is a schematic diagram illustrating photo-elasticity according to one embodiment of the present disclosure.

Figure 8A:
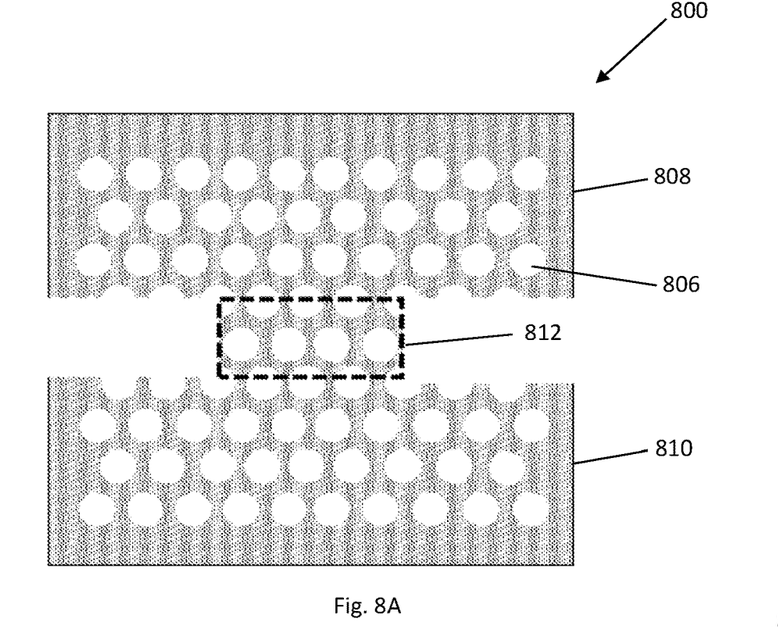
FIG. 8A is a schematic diagram of a photonic crystal cavity sensor according to one embodiment of the present disclosure.

FIG. 8A is a schematic diagram of a photonic crystal cavity sensor 800 according to one embodiment of the present disclosure.

Figure 8B:
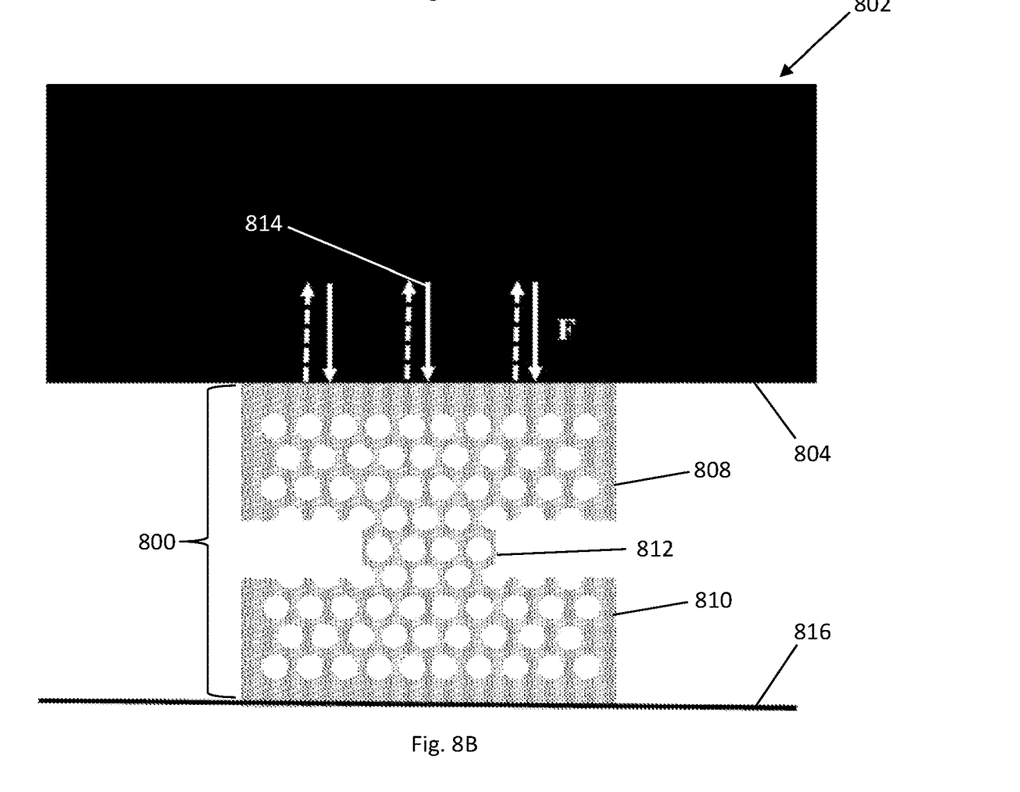
FIG. 8B is a schematic diagram of a sensing component of a gyroscope based on photo-elasticity according to one embodiment of the present disclosure.

FIG. 8B is a schematic diagram of a sensing component 802 of a gyroscope based on photo-elasticity according to one embodiment of the present disclosure.

This embodiment provides a photonic crystal cavity sensor 800 based on photo-elasticity and a corresponding sensing component/sense sensor 802 of a gyroscope that include the sensor.

Another method to measure the Coriolis force of the proof mass is based on the photo-elasticity of the photonic cavity. As shown in FIG. 7, when a tensor 700 is applied to a material 702, it will cause deformation of the material e.g., photonic crystal 702. In FIG. 7, the tensor 700 caused by an external force is applied to the photonic crystal 702, resulting in deformation and changing the crystal's optical properties such as permittivity. The photonic crystal 702 is chosen as a sensor because it is sensitive to the strain induced by the tensor 700. Its output optical signal is strongly correlated to the permittivity of the material. Therefore, by measuring the output optical signals such as the change of resonant frequency, the tensor in the photonic crystal cavity can be obtained, from which the Coriolis force is further derived.

As shown in FIG. 8B, a photonic crystal cavity 800 with a proof mass 804 forms a sensing component 802 of a gyroscope based on photo-elasticity. The photonic crystal cavity 800, as shown in FIG. 8A, comprises a periodic array of holes e.g., 806, and further comprises a first photonic crystal 808, a second photonic crystal 810, and a third photonic crystal 812. The third photonic crystal 812 is smaller, and it is in the center of the photonic crystal cavity 800 and between the first photonic crystal 808 and the second photonic crystal 810. The first photonic crystal 808 and the second photonic crystal 810 are symmetric. The first photonic crystal 808 is attached to the proof mass 804, and is configured to move along with the proof mass 804 when a Coriolis force 814 is applied. The second photonic crystal 810 is fixed and remains stationary relative to a frame 816.

During operation, when the frame 816 is rotating, the sensing part 802 of the gyroscope will be applied with a Coriolis force. The tensor caused by force from the top part of the first photonic crystal 808, which is attached to the proof mass 804, concentrates and causes deformation in the third photonic crystal 812. Such deformation results in a change in optical properties, like permittivity, of the third photonic crystal 812. Therefore, by probing the change of the resonance frequency of the third photonic crystal 812, the tensor from the proof mass 804 is obtained, from which the applied force can be derived. Therefore, a drive may be applied in the gyroscope to measure the Coriolis force of the sense mode, from which the angular velocity can be derived.

Embodiment 4

Figure 9A:
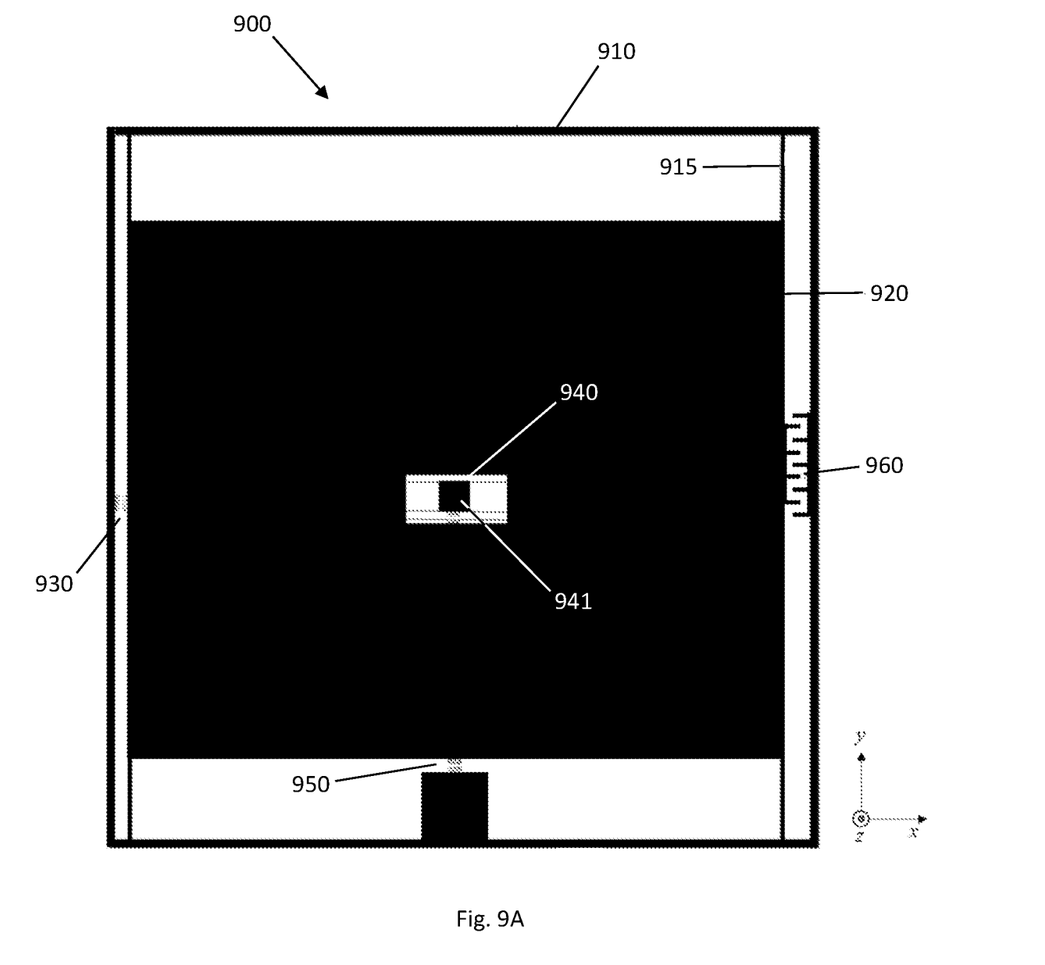
FIG. 9A is a schematic diagram showing a top view of a gyroscope with photonic crystals based on moving boundaries according to one embodiment of the present disclosure.

FIG. 9A is a schematic diagram showing a top view of a gyroscope 900 with photonic crystal sensors based on moving boundaries according to one embodiment of the present disclosure. The gyroscope e.g., Opto-MEMS gyroscope 900 comprises a chip 910, a plurality of nano tethers e.g., 915, a frame 920, a drive sensor 930, a sense sensor 940, a calibration sensor 950, and a drive capacitor 960.

A large slab in the center represents the frame 920, which is suspended by nano tethers 915. In FIG. 9A, only four nano tethers 915 are shown, but during actual implementation, the number of nano tethers 915 may range from several to tens of thousands, depending on requirements such as mechanic Q-factor and resonance frequency.

In some examples, the frame 920 is relatively thicker as compared to a proof mass 941 coupled thereto. The frame 920 may comprise a supporting layer such as a supporting silicon layer, or a buried oxide (BOX) layer with a supporting silicon layer. A thick frame aids in preventing release of tensor on the frame 920 and increase the mechanic Q-factor of a proof mass 941 suspended inside the frame.

For the sense sensor 940, its proof mass 941 is also suspended by nano tethers, which are smaller and mounted in the center of the frame 920. One part of a photonic cavity 942 of the sense sensor 940 is attached to the proof mass 941, and another part of the photonic cavity is fixed firmly on the frame 920. The sense sensor 940 serves to probe the frequency and Coriolis force of the sense mode of the gyroscope 900.

Similarly, the motion of the drive mode of the gyroscope are probed by a photonic crystal cavity sensor formed between the left side of the frame 920 and the chip 910, i.e., the drive sensor 930 configured to probe the drive mode of the gyroscope 900.

An additional photonic crystal sensor is configured between the bottom of the frame 920 and a rigid platform protruding from the chip 910 to calibrate the motion of the frame 920 in the y-axis, i.e., the calibration sensor 950 configured to calibrate motion of the drive frame 920.

The drive capacitor 960 is on the right side of the frame 920 and provides electrostatic impulse for the drive mode (with an exaggerated size for clarity and ease of viewing).

All the sensors in this embodiment have structures similar to that of the sensor in Embodiment 2.

Figure 9B:
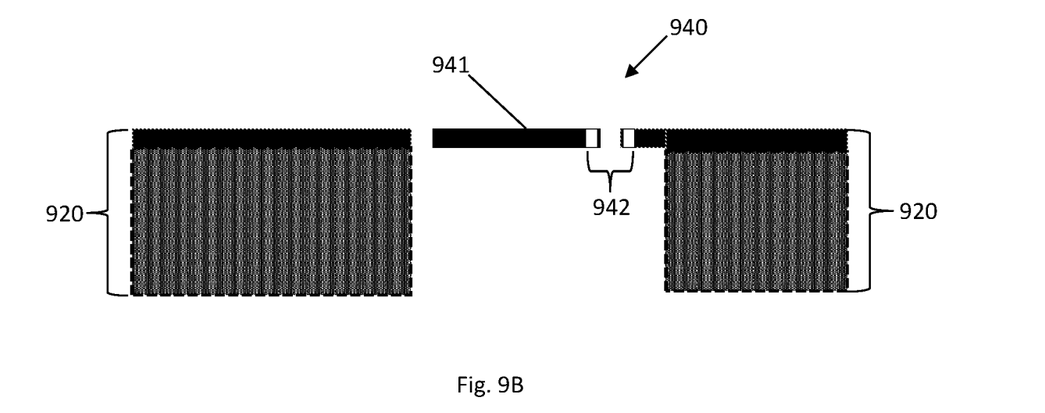
FIG. 9B is a schematic diagram showing a side view of the gyroscope with photonic crystals based on moving boundaries according to one embodiment of the present disclosure.

FIG. 9B is a schematic diagram showing a partial side view of the gyroscope 900 with photonic crystal sensors based on moving boundaries according to one embodiment of the present disclosure. FIG. 9B illustrates the sense sensor as an example. As shown in FIG. 9B, in one example, the frame 920 is thicker than the proof mass 941.

In the example embodiment, the opto-MEMS gyroscope is configured to measure angular velocity based on the Coriolis force of the proof mass measured by the sense sensor.

Embodiment 5

Figure 10:
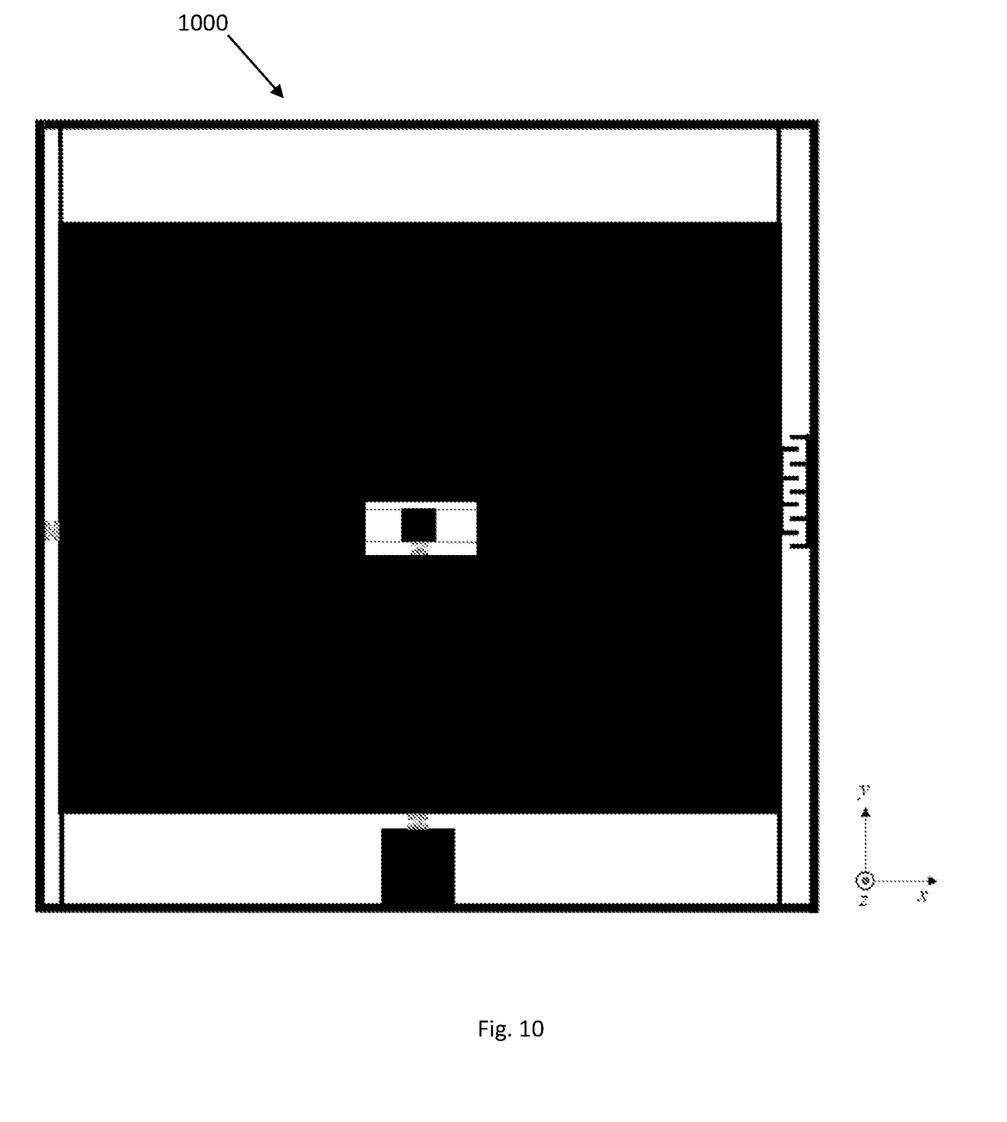
FIG. 10 is a schematic diagram showing a top view of a gyroscope with photonic crystals based on photo-elasticity according to one embodiment of the present disclosure.

FIG. 10 is a schematic diagram showing a top view of a gyroscope 1000 with photonic crystals based on photo-elasticity according to one embodiment of the present disclosure. The gyroscope in FIG. 10 differs from the one in FIG. 9A in that all the sensors in FIG. 10 are replaced by photonic crystal sensors based on photo-elasticity, and they have structures similar to that of the sensor in Embodiment 3. In some other embodiments, the gyroscope 1000 may comprise a mixture of sensors made up of photonic crystal sensors based on photo-elasticity, and photonic crystal sensor based on moving boundaries.

Embodiment 6

The present disclosure also provides a platform comprising a gyroscope structure. Specifically, the platform includes a functional layer and a substrate. The functional layer comprises a proof mass, one or more photonic crystals, and a plurality of nano tethers, whose relationships are as described in any of the above embodiments 1 to 5.

In one example, the substrate is made of silicon, and the functional layer is made of silicon nitride $Si_3N_4$, thereby obtaining a SiN-on-Si platform. To fabricate the SiN-on-Si platform, wet etching (e.g., potassium hydroxide KOH) or dry etching (e.g., xenon difluoride $XeF_2$) is adopted to etch a part of the silicon below the SiN, thereby suspending functional elements made by SiN (i.e., the proof mass, photonic crystals, and nano tethers).

In one example, the platform is a silicon-on-insulator (SOI) platform, comprising supporting silicon in the bottom, a buried oxide (BOX) layer in the middle, and a top silicon layer. The top silicon layer forms the functional layer. The bottom silicon layer and the buried oxide layer form the substrate. To fabricate the SOI platform, a part of the buried oxide layer is etched by wet etching (e.g., hydrogen fluoride HF) or dry etching (e.g., Vapor HF), and then functional elements made by the top silicon (i.e., the proof mass, photonic crystal, and nano tethers) are suspended.

Various embodiments of the present disclosure are illustrated using schematic diagrams or cross-sectional diagrams. Thus, variations in shapes can be expected as manufacturing techniques and/or tolerances may vary. Thus, embodiments of the present invention should not be limited to the particular shapes of regions illustrated, but include the shapes that result, for example, from manufacturing deviations. For example, a region shown as a rectangle at its edges in a drawing can also have rounded or curved features. Thus, the shapes in the figures are illustrative in nature and are not intended to restrict the actual shape of the regions and not intended to limit the scope of the invention.

The terms regarding spatial relationships such as "top," "bottom," "lower," "below," "under," and "on," "above," etc., are used herein for ease of description to describe the relationship of one element or feature to another element or feature as shown in a figure. It should be understood that, in addition to the orientation shown in the figure, the spatial relationship terms are intended to include different orientations of a device during use and operation. For example, if the device in the figures is rotated, then what is described as "below" or "beneath" or "under" may become "on" or "above" or "over." Thus, the term "below" and "under" may include both upper and lower orientations. The device may additionally be oriented differently (e.g., rotated 90 degrees or other orientations), and the spatial relationship used in this description are interpreted accordingly.

The terms "coupled" or "connected" as used in this description are intended to cover both directly connected or connected through one or more intermediate means, unless otherwise stated.

The description herein may be, in certain portions, explicitly or implicitly described as algorithms and/or functional operations that operate on data within a computer memory or an electronic circuit. These algorithmic descriptions and/or functional operations are usually used by those skilled in the information/data processing arts for efficient description. An algorithm is generally relating to a self-consistent sequence of steps leading to a desired result. The algorithmic steps can include physical manipulations of physical quantities, such as electrical, magnetic or optical signals capable of being stored, transmitted, transferred, combined, compared, and otherwise manipulated.

Further, unless specifically stated otherwise, and would ordinarily be apparent from the following, a person skilled in the art will appreciate that throughout the present specification, discussions utilizing terms such as "scanning", "calculating", "determining", "replacing", "generating", "initializing", "outputting", and the like, refer to action and processes of an instructing processor/computer system, or similar electronic circuit/device/component, that manipulates/processes and transforms data represented as physical quantities within the described system into other data similarly represented as physical quantities within the system or other information storage, transmission or display devices etc.

The description also discloses relevant device/apparatus for performing the steps of the described methods. Such apparatus may be specifically constructed for the purposes of the methods, or may comprise a general purpose computer/processor or other device selectively activated or reconfigured by a computer program stored in a storage member. The algorithms and displays described herein are not inherently related to any particular computer or other apparatus. It is understood that general purpose devices/machines may be used in accordance with the teachings herein. Alternatively, the construction of a specialized device/apparatus to perform the method steps may be desired.

In addition, it is submitted that the description also implicitly covers a computer program, in that it would be clear that the steps of the methods described herein may be put into effect by computer code. It will be appreciated that a large variety of programming languages and coding can be used to implement the teachings of the description herein. Moreover, the computer program if applicable is not limited to any particular control flow and can use different control flows without departing from the scope of the invention.

Furthermore, one or more of the steps of the computer program if applicable may be performed in parallel and/or sequentially. Such a computer program if applicable may be stored on any computer readable medium. The computer readable medium may include storage devices such as magnetic or optical disks, memory chips, or other storage devices suitable for interfacing with a suitable reader/general purpose computer. In such instances, the computer readable storage medium is non-transitory. Such storage medium also covers all computer-readable media e.g., medium that stores data only for short periods of time and/or only in the presence of power, such as register memory, processor cache and Random Access Memory (RAM) and the like. The computer readable medium may even include a wired medium such as exemplified in the Internet system, or wireless medium such as exemplified in bluetooth technology. The computer program when loaded and executed on a suitable reader effectively results in an apparatus that can implement the steps of the described methods.

The example embodiments may also be implemented as hardware modules. A module is a functional hardware unit designed for use with other components or modules. For example, a module may be implemented using digital or discrete electronic components, or it can form a portion of an entire electronic circuit such as an Application Specific Integrated Circuit (ASIC). A person skilled in the art will understand that the example embodiments can also be implemented as a combination of hardware and software modules.

Additionally, when describing some embodiments, the disclosure may have disclosed a method and/or process as a particular sequence of steps. However, unless otherwise required, it will be appreciated the method or process should not be limited to the particular sequence of steps disclosed. Other sequences of steps may be possible. The particular order of the steps disclosed herein should not be construed as undue limitations. Unless otherwise required, a method and/or process disclosed herein should not be limited to the steps being carried out in the order written. The sequence of steps may be varied and still remain within the scope of the disclosure.

Further, in the description herein, the word "substantially" whenever used is understood to include, but not restricted to, "entirely" or "completely" and the like. In addition, terms such as "comprising", "comprise", and the like whenever used, are intended to be non-restricting descriptive language in that they broadly include elements/components recited after such terms, in addition to other components not explicitly recited. For an example, when "comprising" is used, reference to a "one" feature is also intended to be a reference to "at least one" of that feature. Terms such as "consisting", "consist", and the like, may, in the appropriate context, be considered as a subset of terms such as "comprising", "comprise", and the like. Therefore, in embodiments disclosed herein using the terms such as "comprising", "comprise", and the like, it will be appreciated that these embodiments provide teaching for corresponding embodiments using terms such as "consisting", "consist", and the like. Further, terms such as "about", "approximately" and the like whenever used, typically means a reasonable variation, for example a variation of +/−5% of the disclosed value, or a variance of 4% of the disclosed value, or a variance of 3% of the disclosed value, a variance of 2% of the disclosed value or a variance of 1% of the disclosed value.

Furthermore, in the description herein, certain values may be disclosed in a range. The values showing the end points of a range are intended to illustrate a preferred range. Whenever a range has been described, it is intended that the range covers and teaches all possible sub-ranges as well as individual numerical values within that range. That is, the end points of a range should not be interpreted as inflexible limitations. For example, a description of a range of 1% to 5% is intended to have specifically disclosed sub-ranges 1% to 2%, 1% to 3%, 1% to 4%, 2% to 3% etc., as well as individually, values within that range such as 1%, 2%, 3%, 4% and 5%. The intention of the above specific disclosure is applicable to any depth/breadth of a range.

While particular elements, embodiments, and applications of the present invention have been shown and described, it is understood that the invention is not limited thereto because modifications may be made by those skilled in the art, particularly in light of the foregoing teaching. It is therefore contemplated by the appended claims to cover such modifications and incorporate those features which come within the spirit and scope of the invention.

What is claimed is:

1. An opto-MEMS gyroscope, comprising
a chip;
a frame suspended by a plurality of nano tethers from the chip;
a sense sensor configured to probe a sense mode of the gyroscope;
a drive sensor configured to probe a drive mode of the gyroscope;
a calibration sensor configured to calibrate motion of the frame; and
a drive capacitor configured to provide electrostatic impulses for the drive mode,
wherein each of the sense sensor, the drive sensor, and the calibration sensor comprises a sensing component comprising, a proof mass configured to be displaced relative to the frame in response to a Coriolis force applied to the sensing component; and a photonic crystal cavity comprising,
a first photonic crystal coupled to the proof mass; and
a second photonic crystal coupled to the frame;
wherein the first and second photonic crystals each comprises an array of holes formed thereon;

wherein the photonic crystal cavity of the sensing component of the sense sensor is configured to generate an optical output in response to the Coriolis force, and wherein the sensing component of the sense sensor is configured to measure Coriolis force based on the optical output.

2. The opto-MEMS gyroscope according to claim 1, wherein the photonic crystal cavity further comprises a gap defined between the first and second photonic crystals;

wherein the gap has a gap size that is defined as the distance between two opposing faces of the first and second photonic crystals; and wherein the optical output of the photonic crystal cavity is configured to be modulated by a change in the gap size.

3. The opto-MEMS gyroscope according to claim 1, wherein the photonic crystal cavity further comprises a third photonic crystal coupled to the first photonic crystal and the second photonic crystal, such that the third photonic crystal is positioned at the center of the photonic crystal cavity between the first photonic crystal and the second photonic crystal; and wherein the third photonic crystal is configured to be deformed in response to a tensor applied by the first photonic crystal.

4. The opto-MEMS gyroscope according to claim 1, wherein the opto-MEMS gyroscope is configured to measure angular velocity based on the Coriolis force measured by the sense sensor.

5. The opto-MEMS gyroscope according to claim 1, wherein the sense sensor is in a center of the frame, and the proof mass of the sense sensor is suspended by nano tethers from the frame.

6. The opto-MEMS gyroscope according to claim 1, wherein the frame is a rectangular frame.

7. The opto-MEMS gyroscope according to claim 6, wherein the drive sensor is formed between the chip and a first outer side of the frame, the drive capacitor is formed between the chip and a second outer side of the frame opposite to the first outer side, and the calibration sensor is formed between the chip and a bottom outer side of the frame.

8. The opto-MEMS gyroscope according to claim 2, wherein the first photonic crystal is configured to move in tandem with the proof mass; and wherein the gap size is configured to change in response to the movement of the first photonic crystal.

9. The opto-MEMS gyroscope according to claim 2, wherein the change in the gap size causes boundary conditions and optical confinement parameters of the photonic crystal cavity to be changed, which in turn causes the optical output of the photonic crystal cavity to be changed.

10. The opto-MEMS gyroscope according to claim 3, wherein the third photonic crystal is smaller in size than the first photonic crystal and the second photonic crystal.

11. The opto-MEMS gyroscope according to claim 3, wherein the third photonic crystal is smaller in size than the first photonic crystal and the second photonic crystal.

12. The opto-MEMS gyroscope according to claim 1, wherein the first and second photonic crystals are symmetrically arranged with respect to each other.

13. The opto-MEMS gyroscope according to claim 1, wherein the array of holes in the first and second photonic crystals comprise a periodic arrangement of holes.

14. The opto-MEMS gyroscope according to claim 3, wherein the third photonic crystal comprises an array of holes with a periodic arrangement.

* * * * *